United States Patent [19]
Baratti

[11] 3,859,626
[45] Jan. 7, 1975

[54] VEHICLE ENGINE OIL TEMPERATURE PRESSURE AND METAL DETECTING DEVICE

[76] Inventor: Mario Baratti, 900 S. Fifth Ave., Maywood, Ill. 60153

[22] Filed: June 7, 1973

[21] Appl. No.: 367,830

[52] U.S. Cl. ............................. 340/52 F, 307/10 R
[51] Int. Cl. ........................................... G08b 19/00
[58] Field of Search ........ 340/52 F, 53, 59, 60, 236, 340/240, 244; 200/61.09; 307/10 R

[56] References Cited
UNITED STATES PATENTS

| | | | |
|---|---|---|---|
| 2,511,631 | 6/1950 | Gordon | 340/52 F |
| 2,878,342 | 3/1959 | Arthur | 200/61.09 |

*Primary Examiner*—Alvin H. Waring
*Attorney, Agent, or Firm*—Hill, Gross, Simpson, Van Santen, Steadman, Chiara & Simpson

[57] ABSTRACT

A device for monitoring the oil pressure, oil temperature, and the presence of metal particles in oil for an engine and including a warning indicator which is energized upon the occurrence of either metal particles in the oil, or if the oil pressure falls below a pre-determined value, or if the oil temperature exceeds pre-determined limits.

4 Claims, 5 Drawing Figures

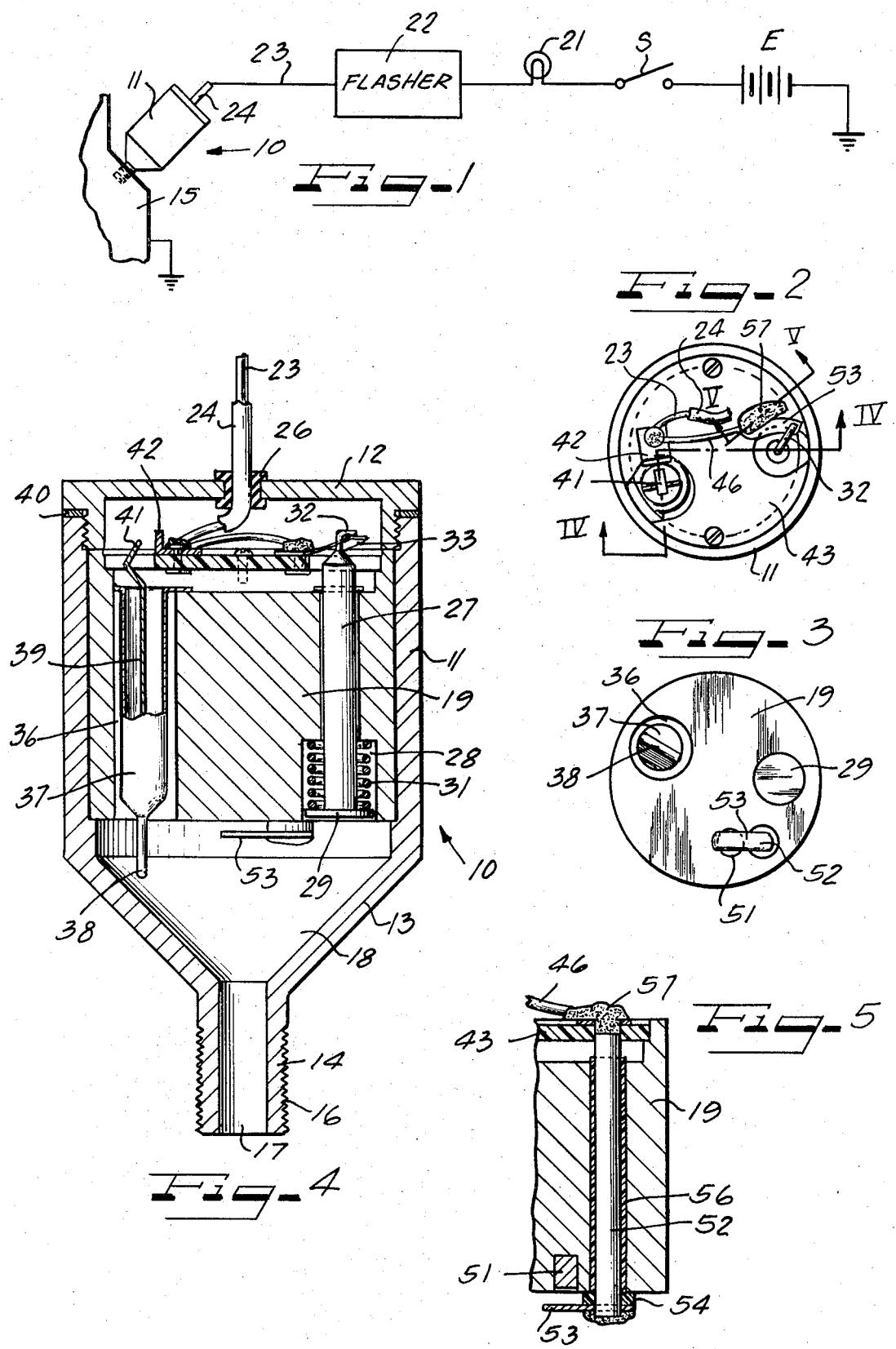

VEHICLE ENGINE OIL TEMPERATURE PRESSURE AND METAL DETECTING DEVICE

BACKGROUND OF THE INVENTION

This invention relates in general to monitoring devices and in particular to apparatus for monitoring the oil pressure, oil temperature, and presence of metal particles in oil.

Description of the Prior Art

Prior art devices have monitored pressure and temperature of oil and have been interconnected with the ignition circuit to open the circuit upon the loss of oil pressure or over heating of the oil.

However, a dangerous condition exists if the engine of a vehicle is turned off by opening its ignition circuit when the vehicle is moving along the highway, for example.

SUMMARY OF THE INVENTION

The present invention provides a compact and inexpensive safety device which can be mounted in the opening of the engine crank case where the prior art oil sensors are mounted and which will continuously monitor oil pressure, oil temperature, and the pressure of metalic particles in the oil and which is connected to a warning device as for example a flashing light mounted on the dashboard or in other suitable locations indicating either the existance of low oil pressure, excessively high temperature, or metalic particles in the engine.

Other objects, features, and advantages of the invention will be readily apparent from the following description of certain preferred embodiments thereof taken in conjunction with the accompanying drawings, although variations and modifications may be effected without departing from the spirit and scope of the novel concepts of the disclosure and in which:

BRIEF DESCRIPTION OF THE DRAWINGS

FIG. 1 illustrates the monitoring device of the invention installed in an engine.

FIG. 2 is a top view of the invention with the cover removed.

FIG. 3 is a bottom view of the sensing unit.

FIG. 4 is a sectional view taken on line IV—IV of FIG. 2, and

FIG. 5 is a sectional view taken on line V—V of FIG. 2.

DESCRIPTION OF THE PREFERRED EMBODIMENTS

As illustrated in FIG. 1, the protective device of the invention comprises a generally cylindrical case 11 which is mountable in the engine block 15 of an engine. As shown in FIG. 4, the cylindrical wall portion connects to a conical end 13 which connects to a sleeve 14 that is externally threaded as shown by the thread 16. A central opening 17 allows oil from the crank case to pass up into the interior 18 of the conical portion 13 where its condition is to be monitored.

As shown in FIG. 1, an electrical lead 23 is surrounded by insulation 24 and is connected to a flasher unit 22. The other side of the flasher unit 22 is connected to a warning light 21 which is mounted in a suitable location to be monitored. For example, the light 21 might be on the dashboard of an automobile if the invention is installed in an automobile engine. The other side of the light 21 is connected to a switch S which has its outer terminal connected to one terminal of the battery E and the other terminal of the battery E is connected to ground.

FIGS. 2–5 illustrate the internal construction of the invention. A cover member 12 is threadily connected to the cylindrical housing 11, and a gasket 40 is mounted between the cover 12 and the cylindrical member 11. An internal cylindrical member 19 is mounted within the casing 11 and might be attached to the cap 12, for example. The member 19 is formed with a first opening in which an oil sensing plunger 27 is mounted. An enlarged piston disc 29 is connected to the inner end of the plunger 27 and is received in an enlarged opening 28 formed about the plunger 27 adjacent the cavity 18. A spring 31 biases the plunger 27 downwardly relative to FIG. 4. An electrical contact 32 extends transversely of the plunger 27 and engages a contact 33 when the plunger 27 is in its full down position as illustrated in FIG. 27. When oil under pressure is introduced through the orifice 17 and into the chamber 18 of the invention, suitable oil pressure will cause the piston disc 29 to be depressed against the spring 31, thus moving the contact 32 out of engagement with the contact 33, thus opening the electrical circuit between the member 19 and 11 and contact 33.

A temperature sensing unit is mounted in a second opening 36 formed in the member 19 and includes a cylindrical cover member 37 having a downwardly extending temperature sensing portion 38 which extends into the oil chamber 18 of the device. A bimetallic temperature sensing strip 39 is attached to the end 38 and is formed with an electrical contact 41 at its upper end relative to FIG. 4. The contact 41 is engageable with the contact 42 when the temperature of the oil in the reservoir 18 reaches a temperature which indicates danger to the engine so as to complete the circuit between the contacts 41 and 42. The contact 41 is connected through the cylindrical member 37, the member 19, and the housing 11 to the engine block 15. A metalic particle sensor is also formed in the chamber 19 through an opening extending into the chamber 18 as shown in the FIG. 5. An electrical conducting shaft 52 is mounted in the opening of the member 19 and is surrounded by insulation 56 which prevents electrical contact between the shaft 56 and the member 19. A washer 54 is mounted between the member 19 and an electrical contact 53 which extends out from the shaft 52 as shown. A magnet 51 is mounted in a depression formed in the member 19 below the contact 53. A conductor 46 is connected to the shaft 52 by solder 57.

At the upper end relative to FIGS. 4 and 5 is mounted an insulating disc 43, and the electrical conductor 23 is connected to the contacts 57, 33, and 42.

In operation when the engine is started the switch S is closed to supply voltage from the battery E to the contacts 33, 42 and through shaft 56 to the contact 53. As the engine is started, oil will be formed due to the oil pressure in the engine crank case into the chamber 18 where its temperature and pressure will be monitored as well as the presence of metalic particles will be detected. Initially as the engine starts after the switch S is closed and before the oil pressure in the chamber 18 has come up to operating pressure, the contact 32 will engage the contact 33 because the spring 31 will depress the plunger 27 and the light might momentarily be illuminated until the oil in the chamber 18 reaches a pressure so as to depress the plunger 27 by its action on the piston disc 29 which forces the piston in to the opening 28 thus depressing the spring 31 and separating the electrical contacts 32 and 33 which will cause light 21 to go off. Thereafter as the engine continues to operate the light 21 will be energized only if the temperature exceeds a pre-determined limit in which case the bimetalic strip 39 will bend so that the contact 41 engages the contact 42 thus closing the circuit to the flasher 22 and the light 21 to give a warning to the operator. Alternatively if the oil pressure drops such that the piston disc 29 moves downwardly so as to allow the contacts 32 and 33 to engage, a warning will be given due to the circuit being closed to the light 21. A third condition of the oil monitored by the contacts 53 and the magnet 51 which may be a permanent magnet. The oil is normally an insulator unless metalic particles are contained in the oil which will be attracted by the magnet 51 so as to complete an electrical circuit between the contact 53 and the magnet 51 and the member 19 and through the housing 11 to the engine block 15. This condition will cause the circuit to be completed to the flasher 22 and the light 21 and will be indicated to the operator with the light 21 flashing on and off.

FIG. 3 is a bottom view of the member 19 illustrating the temperature sensor 38, the piston disc 29, and the contact 53 and magnet 51.

FIG. 2 illustrates the other end of the member 19 with a disc of insulating material 43 mounted thereon which the electrical contact 23 extends where it is connected to contact 42 and by jumper lead 46 to contacts 57 and 33.

It is seen that this invention provides a new and novel monitoring and warning device which senses temperature, pressure, and the presence of metallic particles in oil; and although it has been described with respect to preferred embodiments, it is not to be so limited as changes and modifications may be made which are within the full intended scope as defined by the appended cranks.

I claim as my invention:

1. Apparatus for monitoring the pressure, temperature, and the presence of magnetic particles in a fluid comprising: a pressure monitoring switch mounted in said fluid and with a pair of contacts which close when the pressure of the fluid falls below a preset value; a temperature monitoring switch mounted to monitor the temperature of said fluid and with a pair of contacts which close when the temperature exceeds a pre-set value; a magnetic particle detecting switch including a magnetic contact and a second contact mounted in said fluid such that magnetic particles in said fluid close a circuit between said magnetic and second contact; a voltage source having first and second terminals and one of said contacts of said pressure monitoring, temperature monitoring, and magnetic particle detecting switches connected to a first terminal of said voltage source; a warning device with one side connected to the other contacts of said switches and the other side of said warning device connected to the second terminal of said voltage source, including a housing into which said fluid is received; a body member in said housing with one side in contact with said fluid, wherein said pressure switch comprises a plunger movably mounted in said body member such that variations in fluid pressure moves it, one of said pair of contacts of said pressure monitoring switch insulatingly mounted to said housing, wherein said temperature monitoring switch comprises a bimetallic member mounted to said body member and subject to fluid temperature, said one contact of said temperature monitoring switch mounted thereon and the other contact of the temperature monitoring switch insulatingly mounted to said housing, and wherein said magnetic contact of said magnetic particle detecting switch comprises a magnet mounted in said body member and said second contact is insulatingly mounted in said body member.

2. Apparatus for monitoring pressure, temperature, and the presence of particles in a fluid according to claim 1 wherein said housing is formed with a threaded sleeve which is receivable with the crank case of an engine and said threaded sleeve allows the engine oil to pass into said housing.

3. Apparatus for monitoring pressure, temperature, and the presence of particles in a fluid according to claim 2 wherein said warning device is a light.

4. Apparatus for monitoring pressure, temperature, and the presence of particles in a fluid according to claim 3 wherein a flasher is connected in circuit with said light.

* * * * *